US011623154B2

(12) United States Patent
Stafford et al.

(10) Patent No.: US 11,623,154 B2
(45) Date of Patent: Apr. 11, 2023

(54) DRIVING VIRTUAL INFLUENCERS BASED ON PREDICTED GAMING ACTIVITY AND SPECTATOR CHARACTERISTICS

(71) Applicant: Sony Interactive Entertainment Inc., Tokyo (JP)

(72) Inventors: Jeffrey Stafford, Redwood City, CA (US); Justice Adams, San Mateo, CA (US); Mario Sarria, Jr., San Mateo, CA (US); Jorge Arroyo Palacios, San Mateo, CA (US); Nirmal Rajkumar, San Mateo, CA (US); Michael Chow, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/836,133

(22) Filed: Mar. 31, 2020

(65) Prior Publication Data

US 2021/0299575 A1 Sep. 30, 2021

(51) Int. Cl.
| | | |
|---|---|---|
| A63F 13/86 | (2014.01) | |
| A63F 13/497 | (2014.01) | |
| A63F 13/55 | (2014.01) | |
| A63F 13/69 | (2014.01) | |
| A63F 13/79 | (2014.01) | |
| A63F 13/85 | (2014.01) | |

(52) U.S. Cl.
CPC ............ *A63F 13/86* (2014.09); *A63F 13/497* (2014.09); *A63F 13/55* (2014.09); *A63F 13/69* (2014.09); *A63F 13/79* (2014.09); *A63F 13/85* (2014.09)

(58) Field of Classification Search
None
See application file for complete search history.

(56) References Cited

U.S. PATENT DOCUMENTS

| 9,345,966 | B2 | 5/2016 | Miura et al. |
| 9,454,993 | B1 * | 9/2016 | Lawson ............ H04N 21/47205 |
| 9,672,190 | B1 * | 6/2017 | Yu ............................ A63F 13/85 |
| 10,898,815 | B1 * | 1/2021 | Jia .......................... H04N 21/00 |

(Continued)

OTHER PUBLICATIONS

PCT/US2021/023970, Notification of Transmittal of the International Search Report and the Written Opinion of the International Searching Authority, or the Declaration, PCT/ISA/220, and the International Search Report, PCT/ISA/210, dated Jul. 8, 2021.

*Primary Examiner* — Jason T Yen
(74) *Attorney, Agent, or Firm* — Penilla IP, APC

(57) ABSTRACT

A method is provided, including the following operations: monitoring gameplay activity in a plurality of game sessions, wherein the monitoring includes, for each game session, analyzing the gameplay activity in said game session to predict future gameplay activity in said game session; identifying one or more characteristics of a plurality of spectators interacting with a virtual character, wherein each of the spectators interacting with the virtual character accesses, over a network, a channel that is attributed to the virtual character; through the channel, providing access to the spectators to spectate a selected game session that is one of the plurality of game sessions, selected based on the predicted future gameplay activity and based on the characteristics of the plurality of spectators.

18 Claims, 13 Drawing Sheets

(56) References Cited

U.S. PATENT DOCUMENTS

| | | | |
|---|---|---|---|
| 2007/0117635 A1* | 5/2007 | Spanton | A63F 13/12 463/43 |
| 2009/0209347 A1* | 8/2009 | Roberts | A63F 13/12 463/40 |
| 2016/0067612 A1* | 3/2016 | Ntoulas | A63F 13/327 463/29 |
| 2016/0228776 A1 | 8/2016 | Miura et al. | |
| 2017/0001111 A1* | 1/2017 | Willette | A63F 13/86 |
| 2017/0113143 A1* | 4/2017 | Marr | A63F 13/355 |
| 2018/0117477 A1 | 5/2018 | Miura et al. | |
| 2018/0243656 A1* | 8/2018 | Aghdaie | A63F 13/67 |
| 2018/0250600 A1* | 9/2018 | Trombetta | A63F 13/46 |
| 2019/0208284 A1 | 7/2019 | Guo et al. | |
| 2019/0262724 A1* | 8/2019 | Trombetta | A63F 13/86 |
| 2020/0030697 A1* | 1/2020 | Mueller | A63F 13/352 |
| 2020/0094150 A1 | 3/2020 | Miura et al. | |
| 2021/0185402 A1 | 6/2021 | Guo et al. | |

\* cited by examiner

DRIVING VIRTUAL INFLUENCERS BASED ON PREDICTED GAMING ACTIVITY AND SPECTATOR CHARACTERISTICS

FIELD OF THE DISCLOSURE

The present disclosure relates to systems and methods for driving virtual influencers based on predicted gaming activity and spectator characteristics.

BACKGROUND

Description of the Related Art

An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for driving virtual influencers based on predicted gaming activity and spectator characteristics.

In some implementations, a method is provided, including the following operations: monitoring gameplay activity in a plurality of game sessions, wherein the monitoring includes, for each game session, analyzing the gameplay activity in said game session to predict future gameplay activity in said game session; identifying one or more characteristics of a plurality of spectators viewing and interacting with a virtual character (the virtual influencer), wherein each of the spectators of the virtual character accesses, over a network, a channel that is attributed to the virtual character; through the channel, providing access to the spectators to spectate a selected game session that is one of the plurality of game sessions, selected based on the predicted future gameplay activity and based on the characteristics of the plurality of spectators.

In some implementations, the channel is defined by a web site, a social media platform, a game spectating platform, a video sharing platform.

In some implementations, the channel is configured to provide access for the spectators to stream video content ascribed to, or attributed as being curated by, the virtual character.

In some implementations, providing access to spectate the selected game session includes indicating through the channel that the virtual character is spectating the selected game session.

In some implementations, spectating the selected game session includes streaming video of the selected game session, over the network, to a plurality of client devices associated to the plurality of spectators.

In some implementations, spectating the selected game includes providing, over the network, voice narration of the selected game that is attributed to the virtual character.

In some implementations, monitoring the gameplay activity in a given one of the game sessions includes, receiving, over the network, gameplay metadata from the given one of the game sessions.

In some implementations, the gameplay metadata identifies one or more of a location of a player in a virtual environment, inputs, or gameplay events.

In some implementations, analyzing the gameplay activity includes applying a machine learning model to the gameplay activity to predict the future gameplay activity.

In some implementations, identifying the characteristics of the spectators includes determining one or more of preferences of the spectators, locations of the spectators, ages of the spectators, spectating histories of the spectators, gameplay histories of the spectators.

In some implementations, a method is provided, including the following operations: monitoring gameplay activity in a plurality of game sessions, wherein the monitoring includes, for each game session, analyzing the gameplay activity in said game session to predict future gameplay activity in said game session; identifying one or more characteristics of a plurality of followers of a virtual character on a social platform, the followers of the virtual character being subscribers to the virtual character on the social platform; providing, over a network, access to the followers of the virtual character to spectate a selected game session that is one of the plurality of game sessions, the selected game session being selected based on the predicted future gameplay activity and based on the characteristics of the plurality of spectators.

In some implementations, being subscribers to the virtual character on the social platform enables receipt by the followers of updates from the virtual character on the social platform.

In some implementations, receipt of updates from the virtual character includes receipt of a posting attributed to the virtual character that provides access to spectate the selected game session.

In some implementations, spectating the selected game includes providing, over the network, voice narration of the selected game that is attributed to the virtual character.

In some implementations, monitoring the gameplay activity in a given one of the game sessions includes, receiving, over the network, gameplay metadata from the given one of the game sessions.

In some implementations, the gameplay metadata identifies one or more of a location of a player in a virtual environment, inputs, or gameplay events.

In some implementations, analyzing the gameplay activity includes applying a machine learning model to the gameplay activity to predict the future gameplay activity.

In some implementations, identifying the characteristics of the followers includes determining one or more of preferences of the followers, locations of the followers, ages of the followers, spectating histories of the followers, gameplay histories of the followers.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Figure 1:
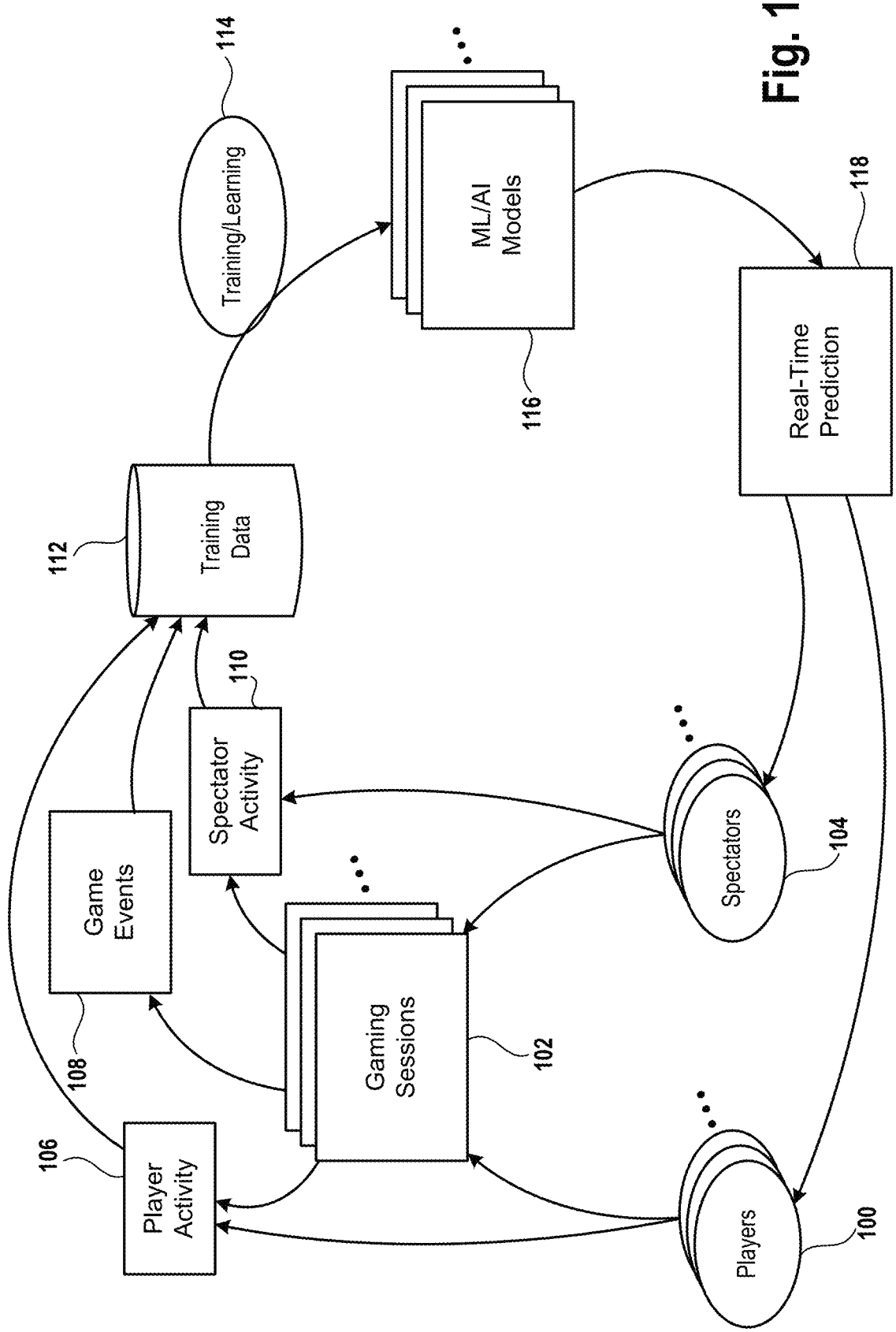
FIG. 1 conceptually illustrates training and use of a machine learning (or artificial intelligence (AI)) model to predict gameplay activity, in accordance with implementations of the disclosure.

FIG. 1 conceptually illustrates training and use of a machine learning (or artificial intelligence (AI)) model to predict gameplay activity, in accordance with implementations of the disclosure. In the illustrated implementation, players 100 engage in gameplay of video games, while spectators 104 spectate the gameplay. The execution of the video game defines gaming sessions 102 during which the gameplay activity occurs. Broadly speaking, the gameplay activity includes player activity 106 as well as game events 108 which occur during the sessions 102 and which can be caused by the player activity. By way of example without limitation, player activity 106 can include any actions by the players, such as device inputs (controller, keyboard, mouse, touchpad, etc.), motion input, voice input, text input, gaze tracking input, player sentiment input, player biometric input, or any other activity or input directly generated by players themselves. Player activity 106 can further include activity generated on behalf of the player by an AI (artificial intelligence) of the video game (or other automatic player assistance or player activity generating process) that is associated to the player. By way of example without limitation, the game events 108 can include any events occurring in the video game session, such as movements of virtual objects (characters, vehicles, etc.) in a virtual environment/space, accomplishments, acquisition or loss of virtual objects/skills/resources/currency/etc., firing weapons, using virtual objects or skills or moves, kills, player deaths, or any other game events which result from the gameplay by the players and/or their associated AI.

Additionally, as the spectators 104 spectate the gaming sessions 102, they generate spectator activity 110. By way of example without limitation, the spectator activity 110 can include any actions by the spectators 104, such as movements within a virtual environment to different locations for spectating, choosing which players to follow, generating comments/reactions, text input, emoji input, voice input, gaze tracking input, device inputs, joining or leaving a particular game session, spectator sentiment, numbers of spectators, time spectators spent on one particular channel, etc. In some implementations, spectators are enabled to interact in ways that directly affect the game session, such as by changing elements in the game's virtual environment (e.g. choosing weapon drops, loot boxes, placing virtual objects, removing/altering virtual objects, etc.), and these interactions are further included as part of the spectator activity 110.

In some implementations, the spectator activity further includes post-event/match/game session activity such as post-event/match/game session comments, duration of engagement after the event, etc. It will be appreciated that post-event activity can be indicative of spectator engagement during the actual event.

Metadata identifying the aforementioned player activity 106, game events 108, and spectator activity 110, can be stored as training data 112, and subsequently used to carry out training 114 of a machine learning/AI model 116 to predict gameplay activity or other related information. It will be appreciated that there can be multiple machine learning models, though for ease of description, such will be described in singular form for purposes of the present disclosure. As described in further detail below, the trained machine learning model 116 can be applied to carry out real-time prediction 118 of gameplay activity and related events, which can be used to enhance the experience of the players 100 as well as the spectators 104.

In some implementations, the machine learning model 116 can be trained using gameplay video. This can be in addition to, or in place of, using gameplay metadata that identifies gameplay activity. The machine learning model 116 can be trained to recognize interesting events in the gameplay video.

In some implementations, the machine learning model 116 is trained to predict when interesting or unusual or otherwise noteworthy events are about to happen. The "interestingness" or interest level of an event can be based on factors included in the training data, such as the number of spectators, the amount and content of comments by spectators that viewed the event (e.g. as determined through semantic/sentiment analysis, natural language processing, etc.), other types of spectator reactions (e.g. recorded audio/speech, spectator reaction inputs such as likes or emoji responses, etc.), the amount and types of player activity involved in the event (e.g. input amount, input type, player movements/moves, weapons usage, skills usage, etc.), etc.

The machine learning model can be trained to understand what constitutes an interesting event, and can be trained to predict when interesting events are likely to occur. This information can then be used to direct spectators 104 to spectate the gameplay sessions and virtual locations within such sessions where interesting events are actively occurring or are predicted to take place in the near future (e.g. within the next 1, 2, 3, 4, 5 minutes, etc.). In this manner, the spectator has a higher chance of witnessing something interesting occurring when spectating video game sessions.

In some implementations, the machine learning model 116 is trained to predict the player's activity. This information can be used to suggest hints or "plays" to a given player, thereby guiding the player in performing gameplay activity that will be of interest to spectators.

In some implementations, the AI/ML model 116 is configured to analyze the post-event/match/game session comments, duration of engagement after the event, etc.

In some implementations, communications with spectators or players are delivered through a virtual character/influencer, or attributed to said virtual character. In some implementations, the virtual character can be configured to vocalize recommendations or other information, or rendered in the view of the players or spectators (e.g. rendered as an overlay, or rendered in a dedicated window/area in the view, etc.). In some implementations, the virtual character is rendered in the virtual environment of the video game being played or spectated.

In the present disclosure, the terms virtual character and virtual influencer are used interchangeably. Broadly speaking, virtual influencers are understood as virtual characters with a personality that can be driven by AI. Virtual influencers can have many followers on social media (e.g. Instagram, Twitter, Facebook, etc.) and their posts can receive hundreds of thousands of likes, shares, comments, or other interactions facilitated on the social media platforms. Virtual influencers are commonly used in social media marketing, offer recommendations and their popularity is increasing, and can be considered competition for human influencers. One example of a virtual influencer is Lil Miquela who, at the time of the present disclosure, has 2 million followers on Instagram (https://www.instagram.com/lilmiquela/).

In some implementations, popular game characters can act as virtual influencers, and may further narrate games for spectators (e.g. online or at an eSports event). Virtual gaming influencers can offer recommendations to followers (spectators) about the best games/players/channels/events to watch on spectating platforms (e.g. Twitch, Mixer, Youtube, etc.). In some implementations, a virtual influencer/narrator can be driven and adapt its behavior to attract more spectators, retain the ones already following, engage more, etc.

Figure 2:
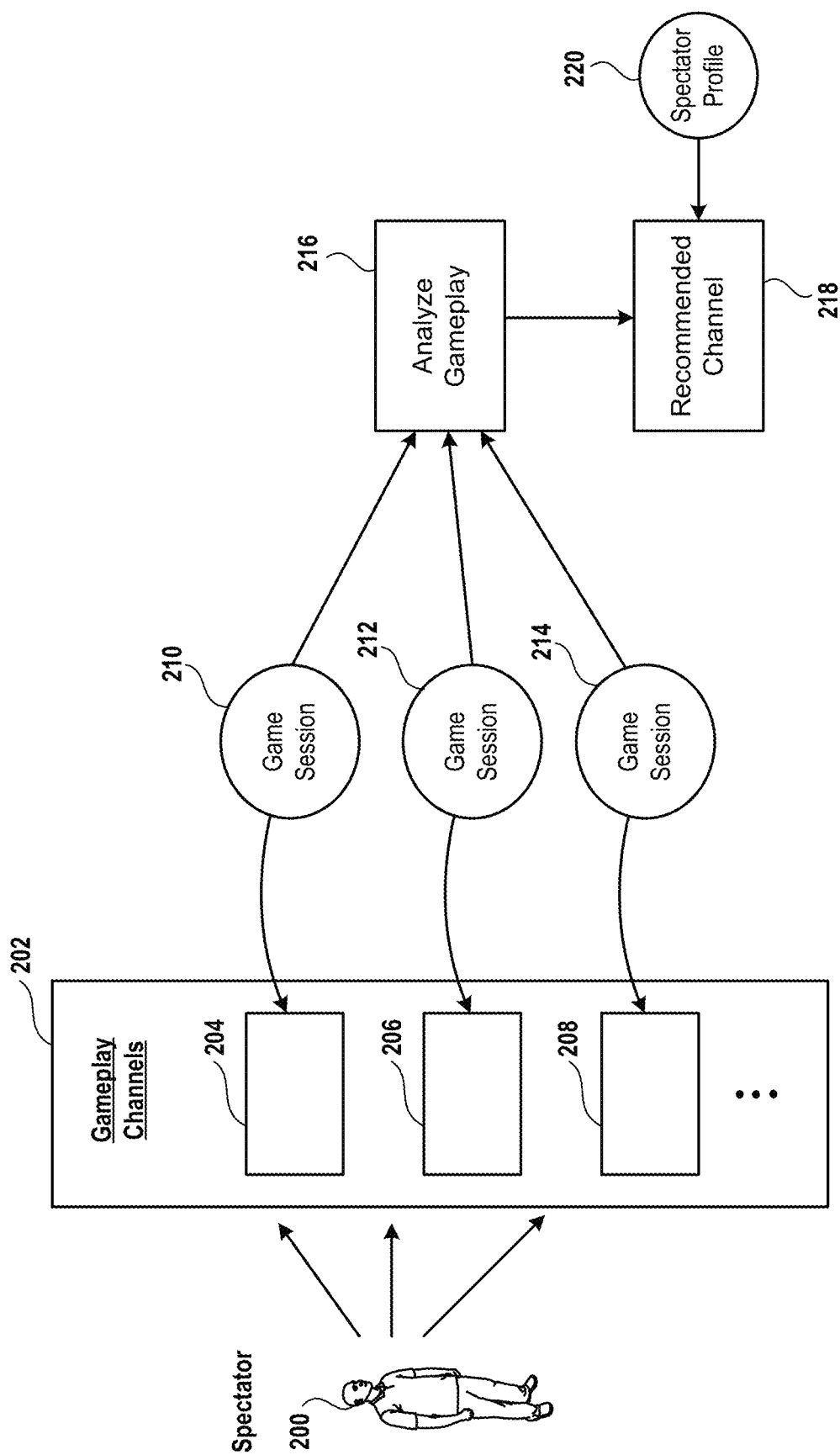
FIG. 2 conceptually illustrates a method for recommending spectating channels to a spectator, in accordance with implementations of the disclosure.

FIG. 2 conceptually illustrates a method for recommending spectating channels to a spectator, in accordance with implementations of the disclosure. In the illustrated implementation, a spectator 200 may choose between various gameplay channels 202 for spectating gameplay of video games. Each gameplay channel 204, 206, 208, etc. provides a live video feed of gameplay of a video game. In some implementations, a gameplay channel provides the live video feed of the gameplay of a specific player of a video game, which can be the specific player's view or a related view (e.g. over-the-shoulder view versus first-person view). Whereas in some implementations, a gameplay channel provides a live video feed of gameplay of a video game, but not necessarily that of a specific player view. For example, the live video feed may be from a predefined location in a virtual environment of the video game, or from a viewpoint that is controllable by the spectator when spectating.

In some implementations the channels stream game state data instead of (or in addition to) a live video feed of the game. In some implementations the game state data is used to facilitate the spectator being in VR (virtual reality) observing the actions of the game and moving and freely exploring the environment. In some implementations, this requires that the spectator has installed the game to a local device, which processes the game state data to synchronize game state with the cloud execution, but enables a different viewpoint for the spectator than that of the player.

In some implementations, the gameplay channels are displayed as, or accessed through, selectable icons in a graphical user interface. These icons may include screenshots from the gameplay, or even consist of live streams in miniaturized form for selection. In various implementations, the gameplay channels can be presented through a website, a game console interface, an app on a mobile device or other computing device, or any other interface or application capable of delivering live streaming of video game gameplay for spectating. In some implementations, selection of the icon triggers playback of the live stream, and/or display of the live stream in expanded form.

It will be appreciated that the spectator 200 may access the gameplay channels 202 using any configuration of hardware, including by way of example without limitation, a personal computer, laptop, tablet, cellular phone, mobile device, game console, set-top box, streaming box/peripheral, etc. It will be appreciated that such devices may be connected to or may include or be integrated with, a display, such as a monitor, television, projector, head-mounted display (HMD), etc.

Each gameplay channel is defined from a respective executing game session, which executes the gameplay and renders the video for the gameplay channel. In the illustrated implementation, the gameplay channel 204 is defined from game session 210; the gameplay channel 206 is defined from game session 212; the gameplay channel 208 is defined from game session 214. Each game session can be analyzed (reference 216) to identify what is occurring in the gameplay, and furthermore identify and/or predict when interesting or unusual events are occurring or about to occur. In some implementations, a machine learning model as described above is employed to predict when in a given gameplay session an interesting event is going to occur (and where in a virtual environment of the video game).

Additionally, in some implementations there can be developer driven prediction. For example, the game developer may predict and recommend content from their game title. In some implementations, the game developer may utilize an AI or humans to perform the prediction and recommendation. It should be understood without limitation, that such an implementation could be used by developers to train an AI, as disclosed herein, before a game title is launched or during a game's alpha, beta, or pre-launch window. This would allow developers to pre-train and thus pre-tune the disclosed system prior to live training once the game title is launched and ensure interesting predictions and recommendations on the first day the game is available to players.

Based on such predictions of when interesting events are going to occur, the system can recommend gameplay channels (reference 218) to the spectator 200 for viewing, thereby directing the spectator 200 to interesting gameplay activity and improving the quality of the time spent by the spectator to spectate gameplay. In some implementations, the system may highlight one or more of the gameplay channels 202 to indicate that something of interest is about to happen, such as by illuminating the channel or its border with a specific color, flashing or animation, displaying an indicator calling attention to the channel or indicating that something is expected to happen soon, etc. In some implementations, a virtual character can be configured to recommend the gameplay channel to the user, and may further comment on what is happening in the gameplay and/or what is predicted to happen.

In some implementations, the system can automatically direct (or recommend) the spectator 200 to a given gameplay channel based on predicting that an interesting event is going to occur in said gameplay channel, such as by selecting/recommending one of the gameplay channels or (recommending) changing the channel from an existing gameplay channel to another one. In some implementations, such switching can be rendered to the spectator as being initiated by a virtual character, such as by rendering the virtual character selecting the gameplay channel or changing the channel. In some implementations, the virtual character is shown in a predefined window in the spectator's view, and the virtual character is configured to communicate to the spectator that they will change the channel to a different gameplay channel. In some implementations, the virtual character can ask the spectator if they would like the virtual character to change the channel or select a channel for them. It will be appreciated that in some implementations, this can be in the form of graphical icons, text dialogue or spoken audio. In some implementations, the virtual character/influencer could also recommend going to a channel based on the spectator's friends having recently joined said channel.

In some implementations, the channel recommendation can be prioritized or filtered according to the spectator's profile 220. For example, the spectator profile may include information such as the spectator's demographic data, age, gender, location, as well as other types of data such as gaming history, games owned or played, game skill levels, game achievements, preferences for types of games, prior spectating history (e.g. games spectated, comments/reactions when spectating, etc.), or other types of profile information which can be used to prioritize or filter channel recommendations for the spectator 200.

Additionally, besides the actions occurring in the game, there can be interesting activity or events that can also be happening on the spectating channel or among spectators. In some implementations, the virtual influencer can invite more people to spectate based on what is happening in the channel.

Figure 3:
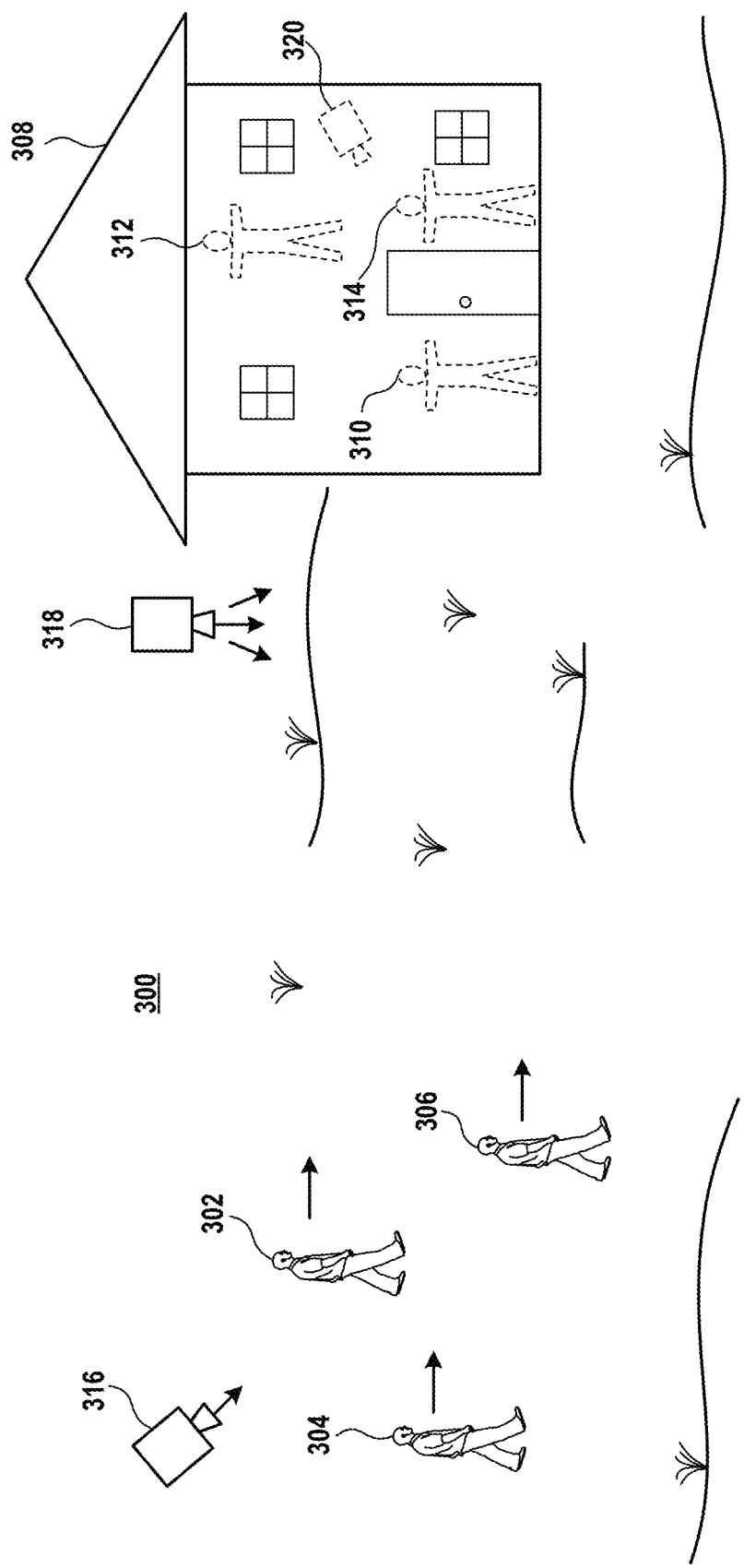
FIG. 3 conceptually illustrates a scene or virtual environment of a video game, wherein prediction of an interesting event occurs, in accordance with implementations of the disclosure.

FIG. 3 conceptually illustrates a scene or virtual environment of a video game, wherein prediction of an interesting event occurs, in accordance with implementations of the disclosure. In the illustrated scene 300, a plurality of players (viz. characters controlled by the players) 302, 304, and 306 are moving towards a house 308. In the house 308 are a plurality of other players 310, 312, and 314. In some implementations, the system may recognize based on such activity occurring in the video game that something interesting is likely to occur soon. For example, the player movements towards the house 308 or towards the other players in the house, may be indicative of interesting activity about to occur. In some implementations, the players 302, 304, and 306 are members of the same team, whereas the players 310, 312, and 312 are members of a competing team, and their proximity to each other or movement towards each other is indicative of interesting activity about to occur.

The concept can be extended to other types of proximity and movement. For example, the movement of one or more players towards or within proximity of one or more non-player characters, e.g. towards a boss character, can be predictive of interesting activity for spectating. Actions by the players, such as arming weapons, deploying troops/non-player characters, activating a skill/ability, can further be predictive, as these may indicate the player is preparing to engage in some interesting gaming activity.

As noted above, a machine learning model can be trained to recognize such situations and activity and predict when interesting activity is going to occur, for example, within an ensuing predefined amount of time. The machine learning model can be trained to identify precursors to interesting activity, with the interesting activity possibly being defined by high levels of player activity, player-to-player interaction, changes in player characteristics, changes in resource levels, achievements, player kills/deaths, etc.

As noted above, the system can enable early training to be performed by the game developer, before allowing early-access to the public (alpha, beta players) or the general public to play their game. In some implementations, the developer could provide activity hints to the AI system by tagging the game's metadata and/or video stream using an API or SDK or other mechanism that is provided to developers for the disclosed system. Thus developers could integrate the tagging process for such a system during development of the game title and ensure their game performs well with the disclosed system when their game goes live or is otherwise released to the public.

When interesting activity is predicted to occur, a spectator can be notified, e.g. by a virtual character or virtual influencer, so that the spectator may join in spectating the particular game session. In some implementations, the system can be configured to provide relevant views to the spectator to enable spectating of the interesting activity from an appropriate vantage point. For example, the spectator could be provided a view from a virtual camera 316 which follows any of players 302, 304, and 306, or a view from a virtual camera 320 which follows any of players 310, 312, and 314, or a view from a virtual camera 318 which provides a view of the vicinity in which the interesting activity is predicted to occur. In some implementations, the spectator is provided various options of views to choose from. In this manner, the spectator is enabled to be informed about interesting activity that is about to take place in a video game, but also enabled to spectate from relevant vantage points in a timely manner. This can be important as the interesting activity is expected to occur imminently or in the near future, and the spectator might miss some interesting action if it takes too long to arrive at the appropriate viewpoint in the virtual environment of the video game.

It will be appreciated that a machine learning model can also be employed to determine suggested viewpoints or virtual camera locations for spectating. For example, a machine learning model can be trained to discover optimal viewpoints based on prior spectator viewing of gameplay, and spectator reactions. For example, the machine learning model could be trained to determine what viewpoints afforded the best spectator experiences, as measured from spectator activity such as spectator comments/reactions (e.g. volume and content of comments, likes, etc.), duration of spectator viewing from a given viewpoint, historical popularity of viewpoints, or from previous training by the game's developers and pre-release players, etc. Then the machine learning model could be applied to predict the best viewpoints for the spectator. As noted, such viewpoints could be presented as options for the spectator to choose from.

In some implementations, the system can generate a video showing the predicted event before it happens. The spectator could view the predicted video of the interesting event, decide that it's truly interesting and then their view is setup (e.g. with an optimally determined viewpoint in the virtual environment) to watch the live game to see if the event does actually occur. In some implementations, if a spectator saw that the event didn't happen the way it was predicted, they could launch a system to recreate the event in a different way. It should be appreciated that this would be changing a video stream being watched by the spectator, but not the live game session being played. The spectator could be enabled to re-broadcast/share their alternative version showing the predicted interesting action to social media, and further possibly including commentary by the virtual character/influencer.

Figure 4:
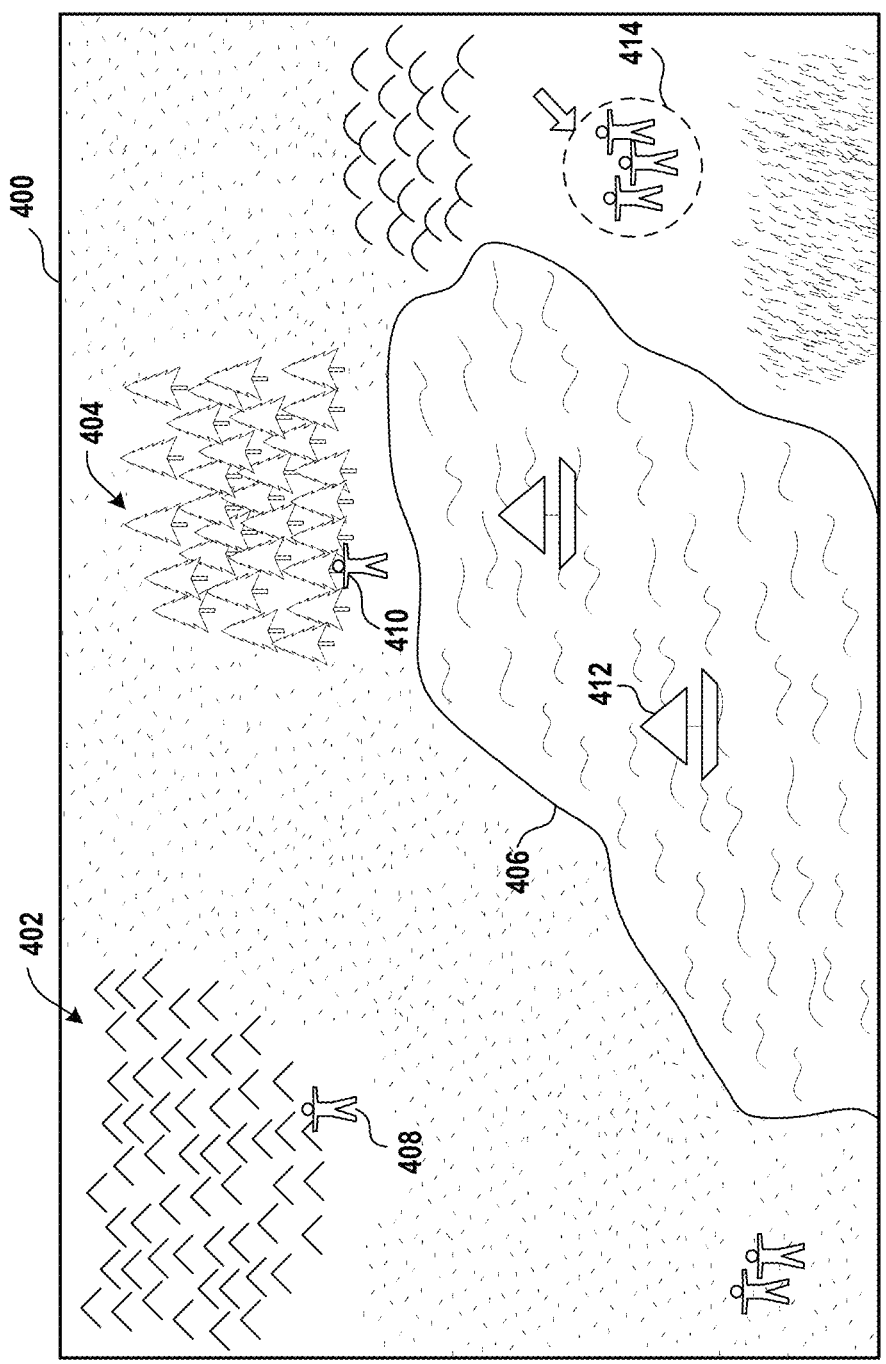
FIG. 4 conceptually illustrates a map view of a video game for purposes of directing a spectator to interesting activity to spectate, in accordance with implementations of the disclosure.

FIG. 4 conceptually illustrates a map view of a video game for purposes of directing a spectator to interesting activity to spectate, in accordance with implementations of the disclosure. In the illustrated implementation, the map view 400 provides an overview (or "god-mode" view) of a virtual environment of the video game, enabling the spectator to see various regions of the virtual environment at once. This map view is distinguished from the regular spectating view, which is a first-person type view within the virtual environment itself. In some implementations, the map view is a 2D (or substantially 2D) overhead view, or a zoomed out view of the virtual environment/virtual space of the video game. From the map view, the spectator can choose a location to spectate, for example zooming to a first-person type view of the virtual environment at the chosen location.

In the map view 400 the spectator may see different regions of the virtual environment, such as in the illustrated implementation, a mountainous region 402, a forest region 404, and a water region 406. There can be activity taking place throughout the various regions of the virtual space, and the locations of characters and objects of note can be shown, such as the character 408 in the mountainous region 402, the character 410 in the forest region 404, and the boat 412 in the water region 406. As there can be a lot of activity occurring, it can be difficult for the spectator to decide what to spectate in the virtual environment.

Accordingly, in some implementations, the system is configured to identify locations of interest, where interesting activity is occurring or expected to occur soon, e.g. using a machine learning model as described. For example, in the illustrated implementation, the location 414 is highlighted as a region of interest, as it contains several players, and the system has detected some interesting gameplay activity or predicted that some interesting gameplay activity is going to occur soon. Thus, the location 414 can be emphasized or highlighted so as to be more visible to the spectator, such as by flagging it with an arrow or other indicator, displaying it with more prominent colors, etc. In some implementations, a notification, pop-up message, or other rendering can be displayed, possibly from a virtual character or virtual influencer. In some implementations, the message or notification can be configured to indicate the activity that is occurring in the highlighted region or what activity is predicted to occur. In some implementations, the message/notification is provided in the form of spoken audio by the virtual character.

Through such notification, the spectator can be provided the option to zoom in to the location 414, and change to a magnified view or first-person view of the activity occurring at location 414, or other type of view that affords detailed viewing of the location 414.

Figure 5A:
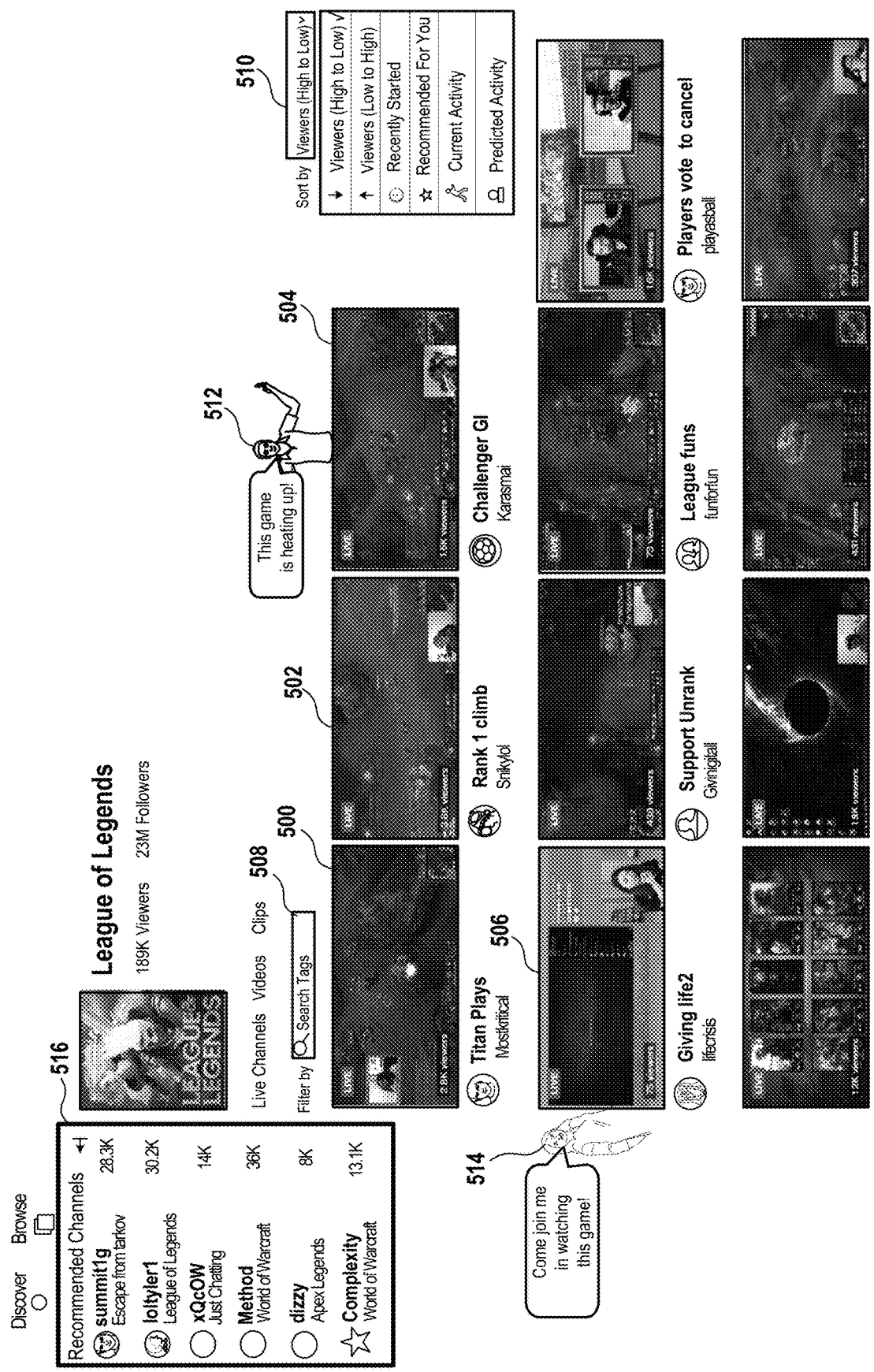
FIG. 5A conceptually illustrates an interface for spectating live gameplay of video games, in accordance with implementations of the disclosure.

FIG. 5A conceptually illustrates an interface for spectating live gameplay of video games, in accordance with implementations of the disclosure. Various gameplay channels, such as channels 500, 502, 504, 506, etc. are shown. Each channel is selectable to initiate live viewing/spectating of the gameplay for that channel. In the illustrated implementation, the channels can be represented/displayed as screenshots, prerecorded video clips (that can be looped), or even live video. Each gameplay channel is configured to display the live gameplay of a video game, e.g. from the perspective of a particular player, as defined or selected by the spectator, or possibly associated with a virtual character or influencer.

In some implementations, the interface is configured to show, and provide access to, various sessions of a single video game; whereas in other implementations, the interface is configured to show, and provide access to, sessions of different video games. In various implementations, the interface is displayed through a web page, an app/application, a game console system environment, a virtual reality (VR) interface/environment, etc. As shown, each displayed channel can include various related information, such as a name/title of the channel, the number of viewers/spectators currently spectating the channel, the length of time the channel has been active, the name of a player/user to whom the channel is associated (or that created/owns the channel, or who's gameplay the channel displays), the number of players engaged in multi-player gameplay, etc.

A search field 508 enables the user to enter search terms/tags, according to which the system can filter/surface gameplay channels having said search terms/tags associated therewith. For example, the user may be interested in a particular character or scene of a video game, and by using the search field 508, the user can more easily find gameplay channels featuring the desired character or scene.

A sort feature 510 enables the user to sort the gameplay channels according to a selected criteria and ordering, such as by number of viewers (high to low, or low to high), most recently started, recommended, etc. In some implementations, the criteria for sorting can include current activity, whereby gameplay channels are sorted according to the level of activity currently occurring in the respective gameplay of the channels. It will be appreciated that the level of activity can be determined based on analyzing the gameplay of the various channels, and based on such factors as the amount of player activity and movement, player communication, weapons firing or attacks, number of players interacting, etc. By sorting according to the current level of activity, users are enabled to more easily find gameplay channels currently showing action at the present time, which they may find immediately engaging.

In some implementations, the criteria for sorting can include predicted activity, whereby gameplay channels are sorted according to predicted levels of activity. That is, the amount of activity predicted to occur in the near future (e.g. within a predefined ensuing period of time) is determined, and the channels can be sorted based on the expected future activity. As discussed, interesting activity can be predicted based on various gameplay related factors, and may employ a machine learning model. In some implementations, the prediction can include predicting a trend in activity in the gameplay sessions, and the channels can be sorted based at least in part on these trends, e.g. prioritizing channels for which the predicted trend in gameplay activity is increasing, over those for which the predicted trend is decreasing. In this manner, users can be directed to spectate channels in which the gameplay is likely to become more interesting over time, and in the near future.

In some implementations, a virtual character can be rendered in the interface, to highlight or call attention to a particular gameplay channel. For example, a virtual character 512 is shown highlighting the gameplay channel 504, indicating that the gameplay activity is becoming (or predicted to become) more intense.

As discussed, in some implementations, a virtual character provides narration/commentary and may direct spectating viewpoints in a gameplay session. In the illustrated implementation, the virtual character 514 is shown inviting the user to join the virtual character in spectating the gameplay channel 506. Thus, when spectating the channel 506, the user may receive commentary/narration by the virtual character 514, enjoy viewpoints in the virtual environment as directed by the virtual character, see the virtual character 514 rendered in the virtual environment of the video game, etc.

In addition to live channels, in some implementations, replay videos can also be presented. Such replays can also include commentary/narration by a virtual character.

In some implementations, a section of recommended channels 516 is provided as part of the interface. The recommended channels 516 can include links to gameplay channels not specifically being previewed or featured in the interface otherwise. Such recommended channels can be determined based on spectator popularity, ratings, spectating history/preferences or profile of the user, viewership similarity to the user's profile, etc. The recommended channels 516 can further be configured to provide access to a variety of spectating experiences for the user, for example, featuring a variety of video games or types of video games, variety of gameplay settings, variety of gameplay styles, etc.

Figure 5B:
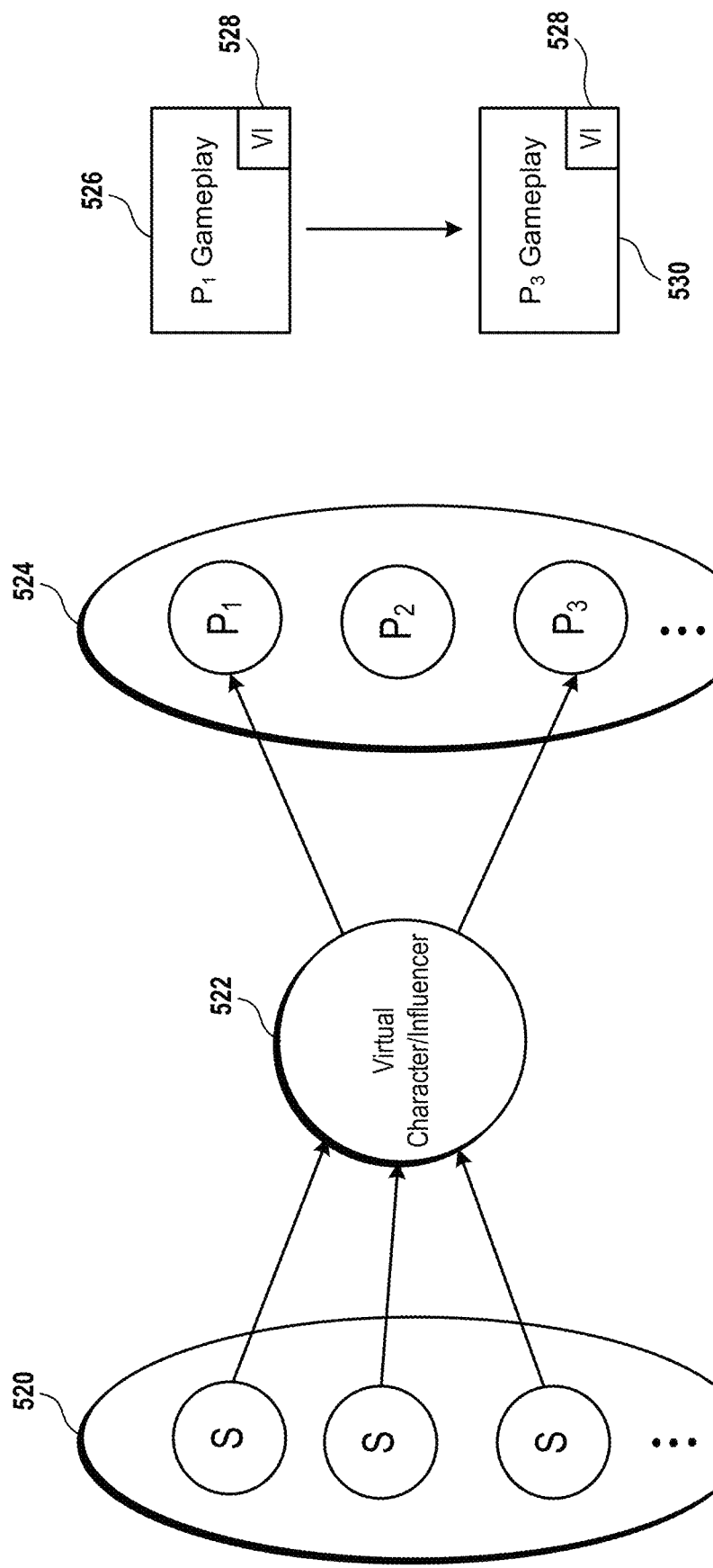
FIG. 5B conceptually illustrates a virtual character or influencer directing spectators to various gameplay channels, in accordance with implementations of the disclosure.

FIG. 5B conceptually illustrates a virtual character or influencer directing spectators to various gameplay channels, in accordance with implementations of the disclosure. In some implementations, various spectators 520 follow a virtual character/influencer 522 in viewing various gameplay channels, which can be the gameplay channels showing the gameplay of various players 524. In some implementations, the virtual character 522 is configured to automatically select which gameplay channel to watch, and as the spectator then watches the gameplay channel selected by the virtual character 522, so the virtual character may provide commentary or narration of the activity occurring in the selected gameplay channel. It will be appreciated that the selection of the gameplay channel by the virtual character 522 can be driven by prediction of interesting activity as previously described, based on the spectator sentiment (e.g. automatically changing the channel if spectators are detected to be getting bored), spectator profile and preferences, etc.

By way of example without limitation, when the spectators 520 are following the virtual character 522, and the virtual character 522 selects the gameplay channel of player P1, then they may have a view 526 of player P1's gameplay of a video game, along with an associated view of the virtual character in a predefined window 528. In the window 528, for example, a rendering of the virtual character 522 is shown and animated so as to show the virtual character 522 narrating or commenting upon the gameplay.

At some point, the system may detect/predict that some interesting activity is about to occur in the gameplay of player P3, and responsive to this, the virtual character 522 may communicate as such and proceed to change the gameplay channel to the gameplay channel for player P3. Then the spectators 520 will be provided a view 530 that displays the gameplay of player P3. Again, the virtual character 522 can be rendered in the predefined window 528 and now provide commentary/narration regarding the gameplay of player P3. The predefined window 528 can be persistent as the gameplay channel is changed from one channel to another channel.

In some implementations, a channel on a communication platform can be attributed to the virtual character, such as on a website, social media platform, game spectating platform, video sharing platform, etc. And through the virtual character channel on the communication platform, spectators may access selected gaming sessions for spectating. The selected gaming sessions can be selected based on predicted future activity in the gaming sessions, characteristics of the spectators, etc. It will be appreciated that through the virtual character channel on the communication platform, it may be indicated that the virtual character is spectating a selected game session, and a link can be provided for a spectator to also access and spectate the selected game session.

In some implementations, there can be followers of a virtual character on a social platform, such that the followers of the virtual character are subscribers to the virtual character on the social platform. Access can be provided via the social platform to the followers of the virtual character to spectate a selected game session, for example, selected based on the predicted future gameplay activity and based on the characteristics of the plurality of spectators. For example, followers may receive updates or posts from the virtual character in their social feeds, and an update/post can provide access to spectate the selected game session.

Figure 6:
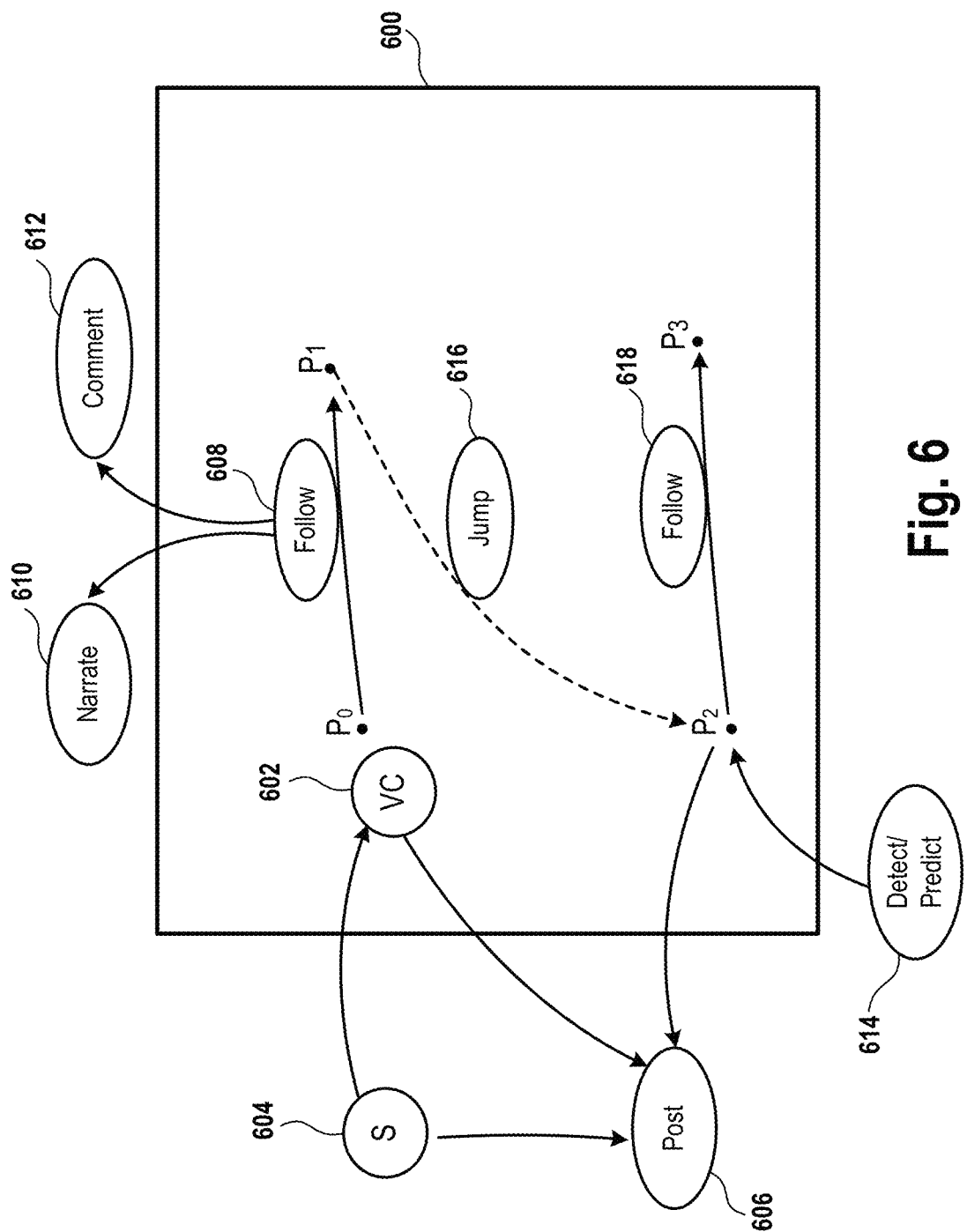
FIG. 6 conceptually illustrates a virtual character bringing spectators to spectate particular locations in a virtual environment of a video game, in accordance with implementations of the disclosure.

FIG. 6 conceptually illustrates a virtual character bringing spectators to spectate particular locations in a virtual environment of a video game, in accordance with implementations of the disclosure. In the illustrated implementation, gameplay of the video game takes place in a virtual environment 600. A virtual character or influencer 602 is configured to draw spectators 604 to the video game to spectate gameplay activity. For example, spectators may join the virtual character 602 in spectating the gameplay through an interface displaying various gameplay channels as described above.

In some implementations, the virtual character 602 is rendered in the spectator's view of the virtual environment 600, so that the virtual character 602 appears to be in the virtual environment 600. In some implementations, the rendering of the virtual character 602 is effected as an overlay on to the spectator's view of the virtual environment 600. It will be appreciated that in various implementations, the virtual character 602 may or may not be visible to the actual players engaged in gameplay of the video game.

In some implementations, when a spectator 604 joins the virtual character 602 in spectating the gameplay, the spectator is provided a viewpoint in the virtual environment 600 that is automatically generated and associated with the virtual character so as to provide viewing of interesting activity occurring in the game play session. In some implementations, the viewpoint is the viewpoint of the virtual character 602, that is, a viewpoint from the perspective of the virtual character (location and direction) in the virtual environment. In some implementations, the viewpoint can be configured to automatically follow interesting activity, specific players, the virtual character 602, etc. In such implementations, the viewpoint can be attributed to the virtual character 602 as the virtual character's viewpoint. For example, in the illustrated implementation the virtual character 602 is initially spectating activity occurring at P0, and then proceeds to follow the activity (reference 608) to a position P1 in the virtual environment 600.

In some implementations, while the initial viewpoint is automatically determined when the spectator joins, thereafter the viewpoint is controllable by the spectator so that the spectator can view in a location and direction of their choosing.

In order to draw spectators to the gameplay, the virtual character 602 can be configured to post (reference 606) to social media or other communications platforms. For example, such posts may describe the gameplay or predicted activity, indicate that it is interesting or exciting, and invite users to join in spectating the gameplay. In some implementations, such posts can include a link to spectate the gameplay (e.g. link to webpage or app/application for spectating). In additional implementations, spectators have the option to join in playing the video game, thus transitioning from spectating to being players in the video game. Mechanisms as described herein can thus be implemented to enable a virtual character/influencer to draw users to not only spectate gameplay, but also join in playing the video game. As the gameplay occurs, the virtual character 602 is configured to provide narration 610 of the gameplay activity, and may further provide comments 612 in response. It will be appreciated that such comments can appear in a stream of comments associated with the gameplay session of the video game, and which are visible to spectators or players of the video game.

Activity occurring in a given region of the video game may taper off over time. However, interesting activity may be detected or predicted (reference 614) to occur at another location in the virtual environment 600. In the illustrative implementation, such interesting activity has been detected or predicted to occur at location P2 in the virtual environment 600. Thus, the virtual character can be configured to jump (reference 616) to the location P2 and begin spectating (and narrating/commenting upon) the gameplay activity occurring at location P2. Spectators that are following the virtual character 602 can be configured to automatically jump to the location P2 along with the virtual character 602, or may be given options to jump to location P2 or remain at their present location. Again, the virtual character 602 may generate posts 606 about the gameplay activity at location P2, and invite users to join in spectating. The virtual character 602 may follow (reference 618) the gameplay activity from location P2 to a location P3, generating posts, narration, and/or commentary along the way.

Thus in accordance with the above, a virtual character may move within a virtual environment, bringing followers to spectate interesting events and activity. It will be appreciated that the narration by the virtual character can be generated by an AI model and vocalized. Such AI voice narration can incorporate various types of information, including by way of example without limitation, prediction, player sponsorship, comments, spectator data, etc.

In some implementations, the AI narration can incorporate prediction of the events or player activity based on AI learning as has described herein. That is, the narration may describe interesting activity that is predicted to occur, locations where such activity is predicted to occur, which players to watch for the predicted activity, etc. In this way, the AI narration can provide advance information to spectators enabling them to spectate regions that are predicted to have interesting activity.

In some implementations, the AI narration can incorporate player sponsorship information. For example, the AI narration can be configured to mention a corporate sponsor of a given player (or product or service sold by the corporate sponsor) when narrating activity by the player in the video game. Vocabulary indicative of the corporate sponsor or its products/services can be incorporated in the AI narration vocabulary. This can provide a natural sounding advertisement that is incorporated into the gameplay narration, rather than requiring the narration to pause for product/sponsorship placement. For example, the virtual character might narrate a character jump by a player sponsored by shoe company X by saying, "He jumps like he's wearing a new pair of X shoes!"

In some implementations, the AI narration can incorporate comments from other spectators or players of the video game. In some implementations, the AI narration can be responsive to such comments.

In some implementations, the AI narration can be configured to incorporate spectator data, such as user profile information, demographic information (e.g. age, birthday, gender, geographic location, etc.), user spectating history, etc. For example, the AI narration could say "Happy birthday to John from Toledo," exhibiting awareness of the spectator's name, birthday, and location.

In some implementations, the virtual influencer could take information from current trending topics in social media, news, etc., and insert related comments into the narration/chat comments, etc. (e.g. for a trending topic about the color of a dress, the virtual influencer could comment on whether it should be blue & black or white & gold). Such commentary could enhance the perception of the virtual influencer as having realistic behaviour.

As noted, the virtual character can be configured to generate comments which are added to a comments stream. Comments generated and attributed to the virtual character can incorporate or utilize similar information to that described with respect to narration by the virtual character. Furthermore, the system can be configured to analyze the comments from spectators and detect spectator sentiment. For example, if spectator comment activity is low, or if spectator mood is determined to be low, then comments might be generated in order to stimulate the spectators and thereby increase spectator excitement and encourage more commenting activity. In some implementations, if comment activity is determined to be toxic or combative/unhealthy, then comments might be generated to change the subject, or calm down the situation.

Figure 7:
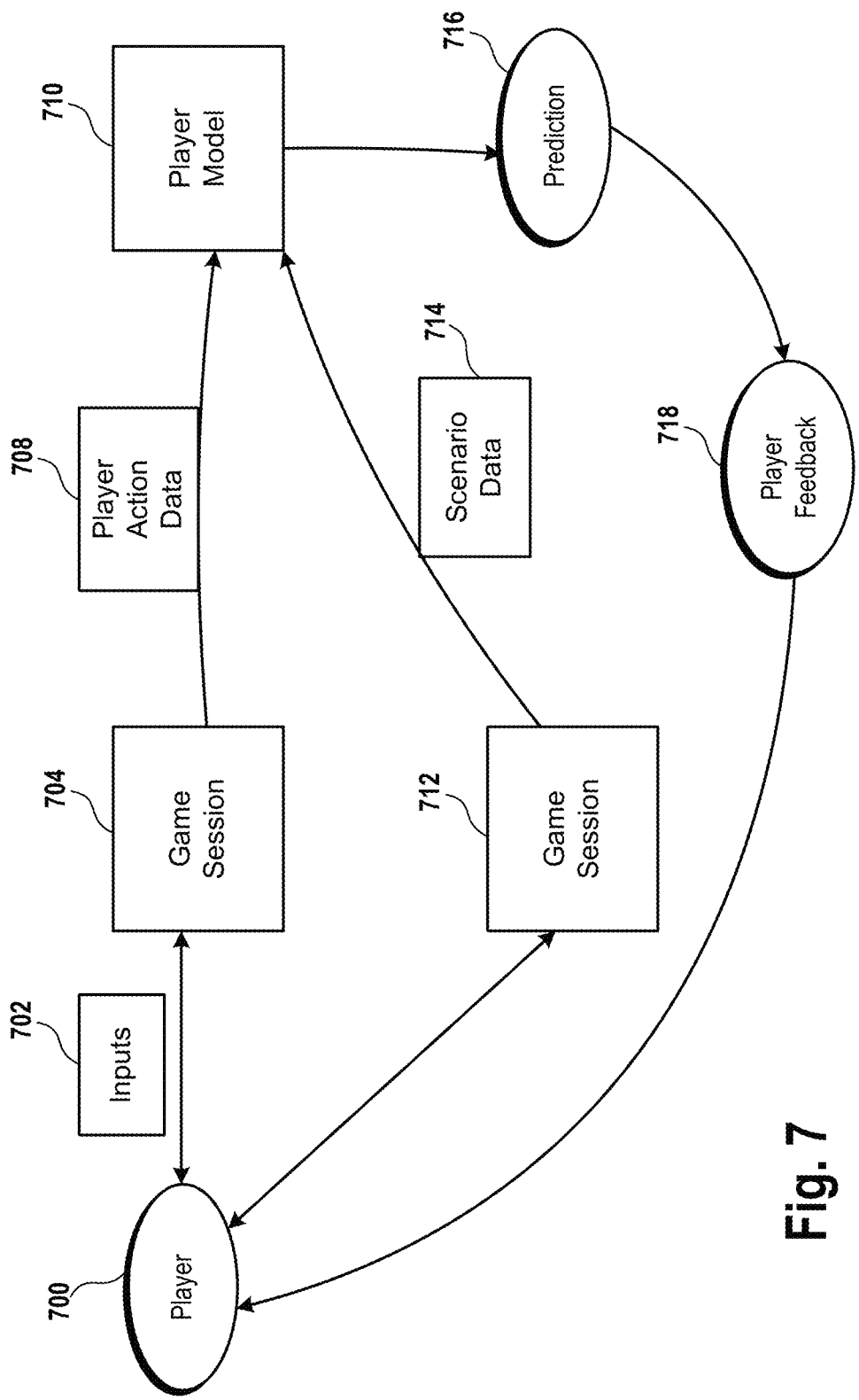
FIG. 7 conceptually illustrates modeling of a player of a video game to predict player actions and provide feedback to the player, in accordance with implementations of the disclosure.

FIG. 7 conceptually illustrates modeling of a player of a video game to predict player actions and provide feedback to the player, in accordance with implementations of the disclosure. Broadly speaking, AI/machine learning can be applied to learn the tendencies of a player and thereby predict the player's future actions in a video game session. In some implementations, information about predicted actions can be surfaced using a virtual character.

In the illustrated implementation, the player 700 engages in gameplay of a video game executed as game session 704. During the gameplay, the player 700 generates inputs 702 (e.g. controller inputs, motion inputs, voice inputs, view direction inputs, etc.) which are processed to drive the game session 704, including updating the game state of the video game and rendering video frames for viewing by the player 700. As the game session 704 is executed, player action data 708 is generated, which includes data describing the gaming actions taken by the player during the course of playing the video game. It will be appreciated that the player action data 708 further includes contextual data identifying the scenarios encountered by the player 700 during their gameplay, in addition to the specific gaming actions effected by the player 700 in response to such scenarios. By way of example without limitation, examples of gaming actions include movements, use of skills, use of weapons, acquisition/manipulation/use of virtual objects, commands, deployments, or any other types of actions that a player may take within the context of the video game. By way of example without limitation, examples of contextual data include data describing or identifying the scene/level/chapter, location within a virtual environment/space, actions by other players, actions by non-player characters/entities, etc.

The player action data 708 is used to train a player model 710, which can be a machine learning/AI model, to predict the behavior of the player 700 during gameplay. During training, the player model 710 learns the gameplay tendencies of the player 700. In some implementations, the player model 710 learns the "plays" of the player 700, which are the courses of action that the player has a tendency to take in response to given scenarios in the video game. In this manner, the trained player model 710 may define or embody a "playbook" for the player 700 consisting of the player's "plays."

Accordingly, in some implementations, the trained player model 710 is used to predict (reference 716) the gaming actions of the player 700, and the predicted actions can be used to provide feedback to the player 700 (reference 718). In some implementations, the player feedback can be provided by a virtual character or influencer as described herein. In some implementations, the virtual character can be displayed in the player's view with text feedback attributed to the virtual character. In some implementations, the virtual character is configured to vocalize feedback to the player, and can be animated speaking the feedback information in the player's view.

In some implementations, the feedback to the player 700 is based on predicted actions for the player 700, such as suggesting certain actions or courses of action to be taken by the player. The suggested actions can be based on the known "plays" associated with the player 700, and are thus predicted in accordance with the player's tendencies. In some implementations, the player 700 can respond to these suggested actions, for example, responding positively and indicating assent to take a suggested action, or responding negatively and indicating that they will not take a suggested action. In some implementations, the player 700 may verbally respond to such suggested actions. For example, the virtual character may ask the player if they would like to take a certain course of action, and the player can respond yes or no.

In some implementations, the player model 710 can be configured to incorporate spectator reactions (e.g. comments, likes, etc.) to the player's actions, so that the trained player model can predict what actions are likely to produce greater spectator engagement or more positive spectator reactions, etc. For example, the player model can be trained to predict what actions by the player are likely to lead to more comments by the spectators, or specifically, more comments with positive sentimentality. The feedback to the player can thus be configured to suggest actions which are predicted to increase spectator engagement.

Figure 8:
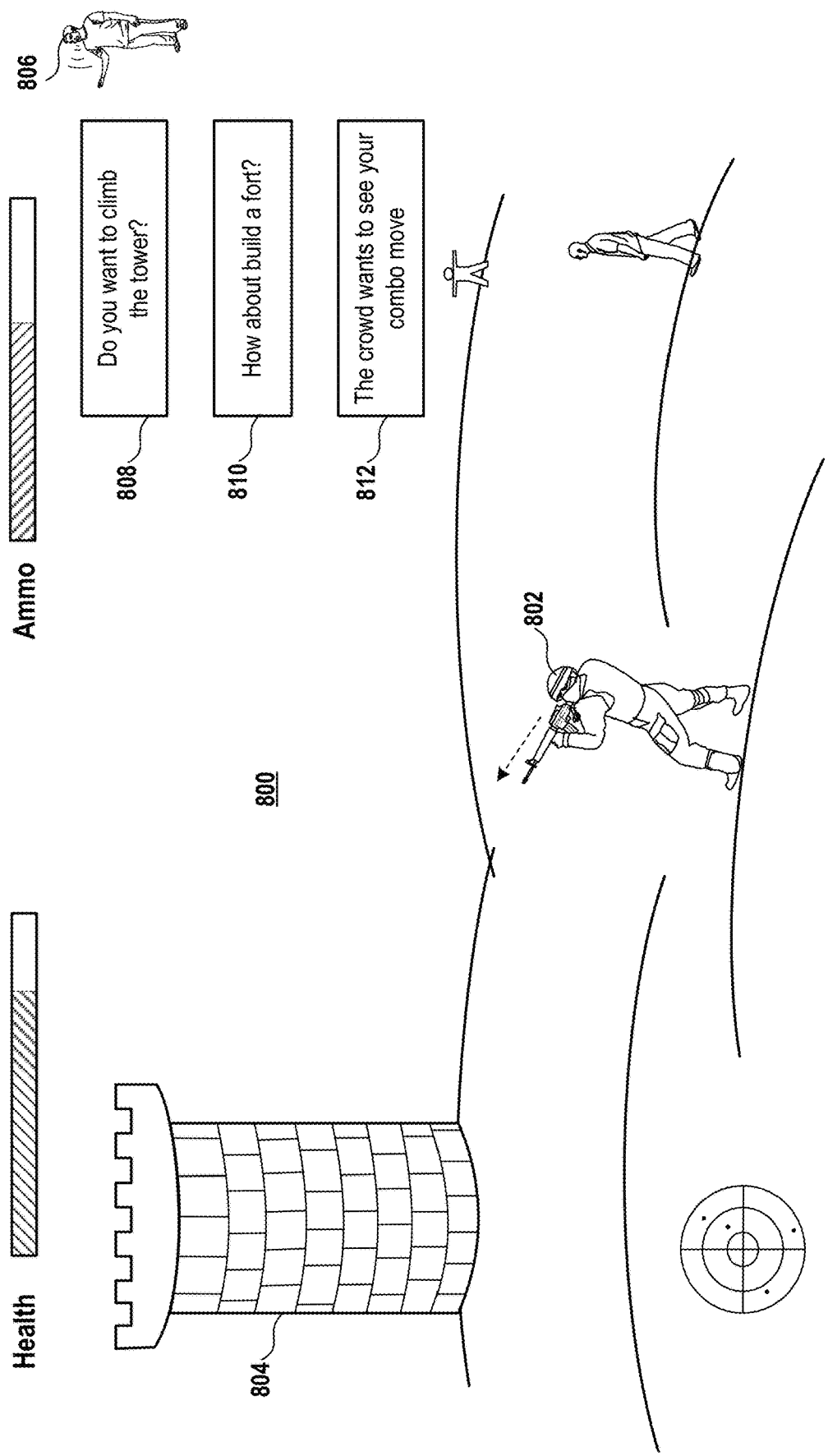
FIG. 8 conceptually illustrates a player's view of a virtual environment of a video game in which the player is actively engaged in gameplay, in accordance with implementations of the disclosure.

FIG. 8 conceptually illustrates a player's view of a virtual environment of a video game in which the player is actively engaged in gameplay, in accordance with implementations of the disclosure. By way of example without limitation, in the illustrated implementation, the player's view is of a scene 800 in which the gameplay occurs. Visible in the player's view is the player's character 802, which is controlled by the player. Also, present in the scene 800 is a tower 804.

As noted above, in some implementations, the player's gameplay can be modeled and predicted using a trained machine learning/AI model. The player's gameplay actions and tendencies can be predicted for the scene 800, and the "plays" from the player's "playbook" can be surfaced to the player as suggestions. In some implementations, this can take the form of tiles or cards displayed to the player, such as tiles 808 and 812, which the player can respond to, indicating agreement or disagreement to the suggested actions.

For example, in the illustrated implementation, the tile 808 is asking the player if they plan to climb the tower 804, and the tile 810 is inquiring if the player plans to build a fort. In some implementations, the player can verbally respond to a given tile by speaking affirmatively or in the negative, such as by saying "yes" or "no." In some implementations, the player can swipe a tile away (e.g. using a touch interface, detected gesture, mouse, etc.) to indicate that they do not plan to do the suggested action, whereas the player can select/tap the tile to indicate that they do plan to do the suggested action. In some implementations, other types of inputs, (such as button presses, joystick movements, gaze tracking inputs, etc.) can be utilized to indicate agreement or disagreement with a suggested action.

In some implementations, the suggested actions can be presented, verbally and/or via the above-described tiles, by a virtual character/influencer 806. The virtual character 806 can be visually displayed in the player's view, and can be animated, for example, to show the virtual character speaking or making gestures, such as reading one of the tiles or pointing to one of the tiles, etc. In some implementations, renderings of the virtual character could also be generated and presented, showing the tile actions in the game, for example as if the virtual character were the player character. The rendering could thus show the virtual character acting out the action ahead of the player, and may be rendered so as to appear as a "ghost" of the player, e.g. with translucency/transparency.

In some implementations, as noted above, feedback to the player can be based on spectator sentiment such as may be determined from analysis of comments generated by the spectators. For example, in the illustrated implementation, the tile 812 indicates to the player that the spectators have indicated that they wish to see the player perform a certain move in the video game.

Figure 9:
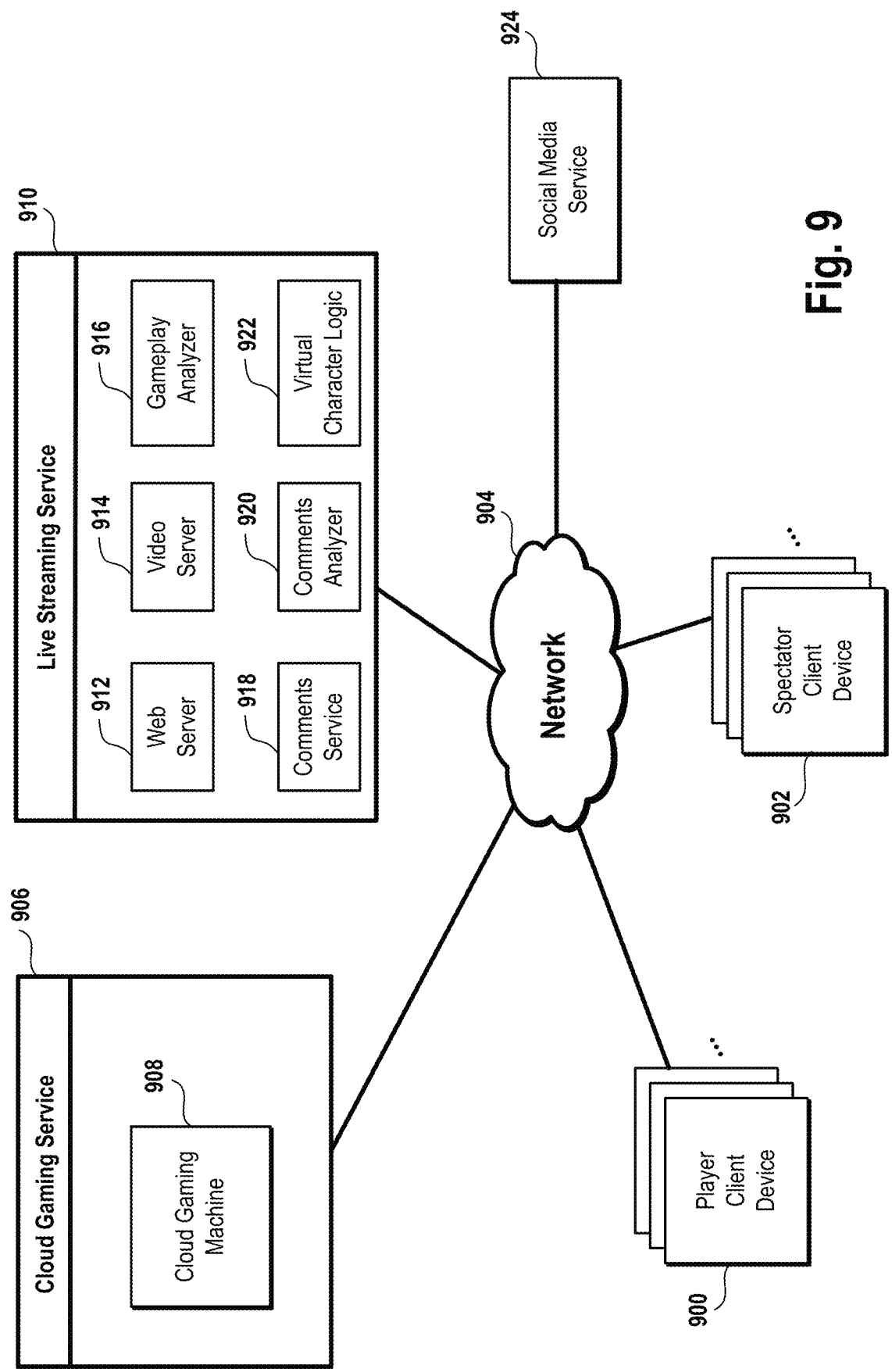
FIG. 9 illustrates a system for enabling a virtual character to enhance a spectator experience of a video game, in accordance with implementations of the disclosure.

FIG. 9 illustrates a system for enabling a virtual character to enhance a spectator experience of a video game, in accordance with implementations of the disclosure. In the illustrated implementation, players of the video game operate player client devices 900, such as personal computers, game consoles, mobile devices, etc. In some implementations, the video game is executed on one or more of the player client devices; whereas in other implementations the video game is executed by a cloud gaming machine of a cloud gaming service, and gameplay is streamed over the network 904 between the cloud gaming service 906 and the player client devices 900. It will be appreciated that the cloud gaming service 906 can reside in one or more data centers having sufficient hardware/software resources to provide online game streaming.

A live streaming service 910 is configured to enable spectator viewing of the gameplay of the video game. In some implementations, the live streaming service receives the gameplay video, whether from a player client device 900 or the cloud gaming service 906, and distributes the gameplay video over the network 904 to the spectator client devices 902, through which the spectators are able to view the gameplay video. In some implementations, the live streaming service and/or the cloud gaming service can enable spectators to control their point of view within a virtual space of the video game, such as by enabling spectators to control their location and/or view direction within the virtual space. In this manner, spectators can have individualized views of the virtual space of the video game. In some implementations, the live streaming service 910 streams the game state, or a portion thereof, to the client devices 902, and the client devices 902 run a copy or version of the video game that enables spectating based on the received game state. The spectator view of the video game is therefore rendered at the client device, but using game state data that is received from the live streaming service 910. This can further facilitate user-defined viewpoints, allowing spectators to control their view, as described above. In some implementations, the copy of the video game at the client device is configured to have a spectating mode that facilitates such rendering for spectating purposes.

In some implementations, the spectator client device may watch a gameplay via video stream from a live streaming service at a certain quality level, but then decide they wish to purchase the game being played and then stream the game via metadata (game state, etc.) from the live streaming service in a different mode (e.g. streaming the metadata/game state, and using the metadata/game state to render the video locally using the purchased and downloaded game on their local client device). This would allow the spectator to see the game in its best quality and potentially use less network bandwidth when streaming from the live streaming service.

In the illustrated implementation, the live streaming service 910 includes a web server 912 that provides a website or webpage for spectating the video game. In some implementations, a video server 914 is provided for handling distribution of video that provides the spectator view to a given spectator. In some implementations, a comments service 918 is configured to enable comments to be received from the spectators, and posted for viewing by the spectators.

A gameplay analyzer 916 is configured to analyze gameplay occurring in the video game session, so as to identify events and other information based on the gameplay. In some implementations, a comments analyzer 920 is configured to analyze comments by the spectators and understand their meaning.

Virtual character logic 922 is configured to carry out actions that are attributed to a virtual character, such as providing narration and comments as discussed above, which are based on the analysis of the gameplay and the comments. Such narration and comments are transmitted over the network 904 to the spectator client devices.

Additionally, in some implementations, the virtual character logic 922 can access a social media service 924, for example, to enable the virtual character to post to the social media service (i.e. posts are generated on behalf of the virtual character, such as via a social media account of the virtual character). Such posts can reference the gameplay of the video game, include images or video from the gameplay, include a link to a site where a user may spectate the gameplay, purchase the game being played, etc. It will be appreciated that the posts to social media are configured to appear to other social media users as originating from the virtual character.

Broadly speaking, implementations of the present disclosure have been described in which spectators spectate gameplay of a video game over a network. However, in other implementations, methods and systems of the present disclosure are applied in the context of Electronic Sports (e-sports), which are spectated by spectators in a common space such as an arena or stadium, and optionally using common displays. That is, a virtual character can be configured to perform narration and comments related to spectated gameplay of a video game as described above, but such narration and comments can be rendered for listening/viewing in the common space in which the spectators are gathered (e.g. playing back narration through speakers, and projecting comments by the virtual character onto a display/screen that is viewed in common by the spectators.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different compute entities. It will be appreciated that for a distributed game engine, low-latency communication is required to avoid latency issues. To maintain desired frame rates, total time of compute entities and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide compute entities at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 10A:
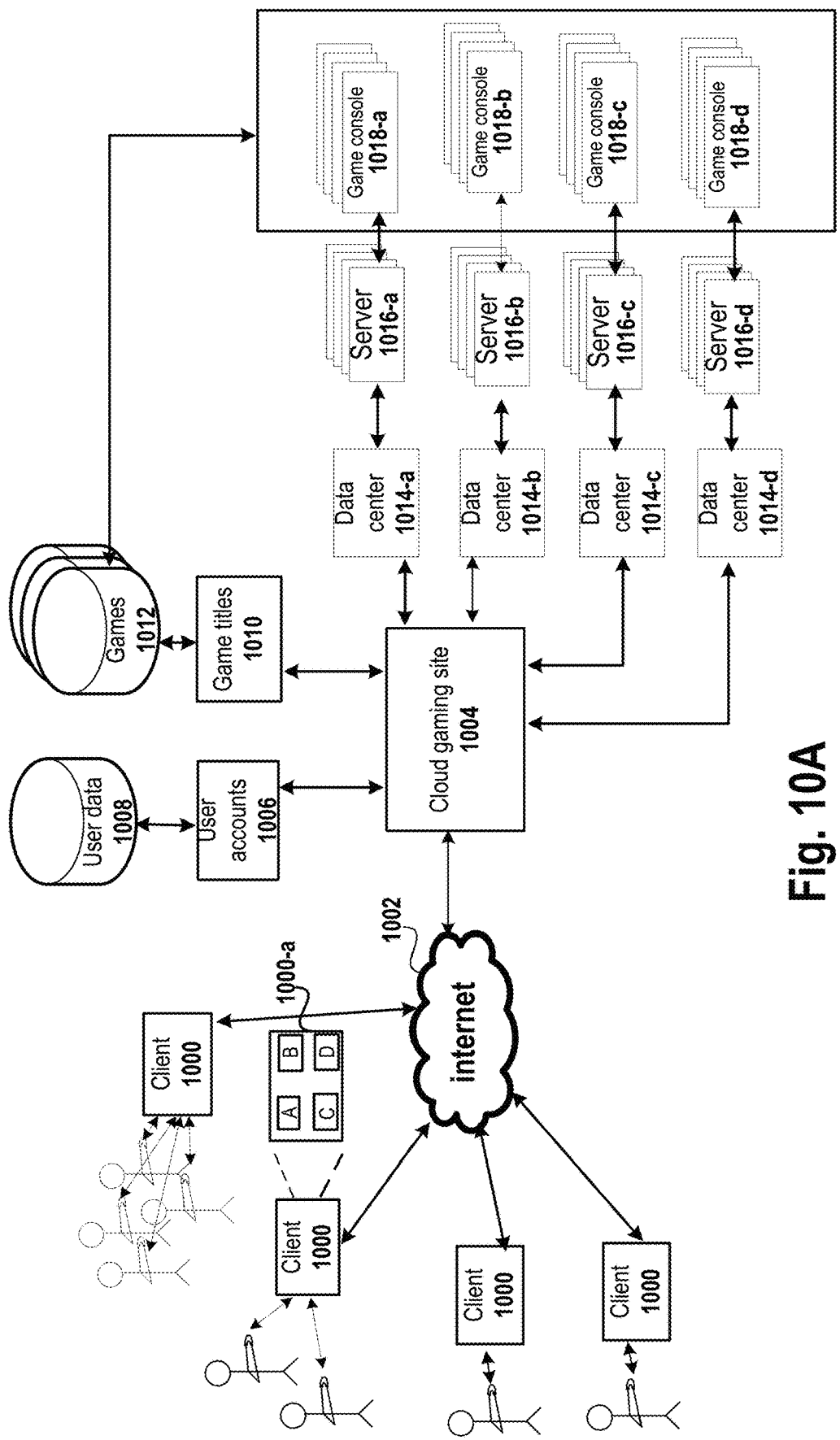
FIG. 10A illustrates an exemplary system used to load game files for a game available through a cloud gaming site, in accordance with implementations of the disclosure.

FIG. 10A illustrates an exemplary system used to load game files for a game available through a cloud gaming site. The system includes a plurality of client devices 1000 that are communicatively connected to the cloud gaming site 1004 over a network 1002, which can include a LAN, wired, wireless, cellular (e.g. 4G, 5G, etc.), or any other type of data network, including the Internet. When a request to access the cloud gaming site 1004 is received from a client device 1000, the cloud gaming site 1004 accesses user account information 1006 stored in a user data store 1008 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 1010 to identify the game titles that are available at the game cloud site for the user account initiating the request. The game titles data store 1010, in turn, interacts with a games database 1012 to obtain the game titles for all the games that are available for the cloud gaming site. As new games are introduced, the games database 1012 will be updated with the game code and the game titles data store 1010 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 1000-*a*, as shown in FIG. 10A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 10B:
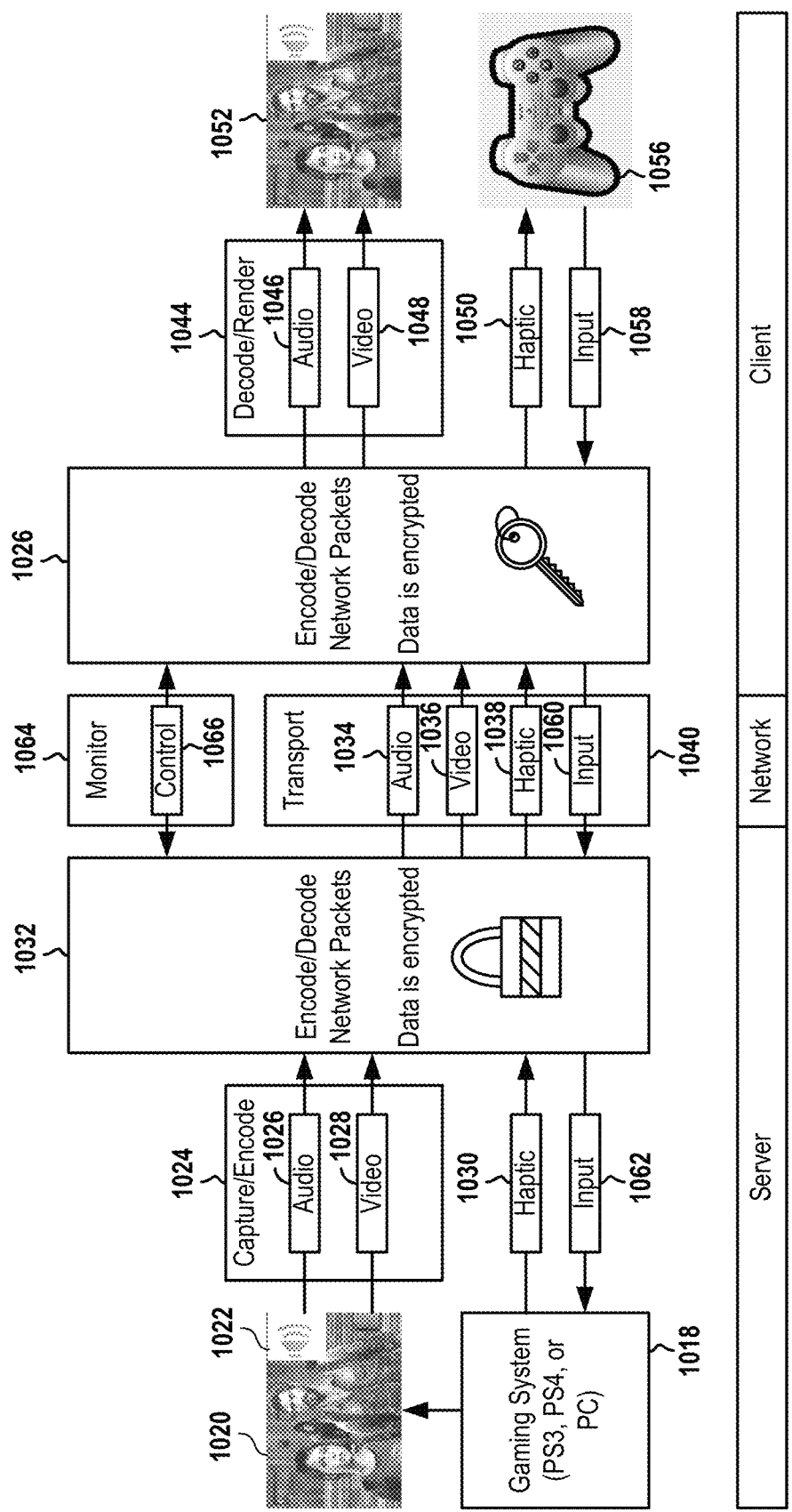
FIG. 10B is a flow diagram conceptually illustrating various operations which are performed for streaming a cloud video game to a client device, in accordance with implementations of the disclosure.

FIG. 10B is a flow diagram conceptually illustrating various operations which are performed for streaming a cloud video game to a client device, in accordance with implementations of the disclosure. The gaming system 1018 executes a video game and generates raw (uncompressed) video 1020 and audio 1022. The video 1020 and audio 1022 are captured and encoded for streaming purposes, as indicated at reference 1024 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 1026 and encoded video 1028 are further packetized into network packets, as indicated at reference numeral 1032, for purposes of transmission over a network such as the Internet. The network packet encoding process can also employ a data encryption process, thereby providing enhanced data security. In the illustrated implementation, audio packets 1034 and video packets 1036 are generated for transport over the network, as indicated at reference 1040.

The gaming system 1018 additionally generates haptic feedback data 1030, which is also packetized into network packets for network transmission. In the illustrated implementation, haptic feedback packets 1038 are generated for transport over the network, as further indicated at reference 1040.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 1040, the audio, video, and haptic feedback packets are transported over a network, such as and/or including the Internet. As indicated at reference 1042, the audio packets 1034, video packets 1036, and haptic feedback packets 1038, are decoded/reassembled by the client device to define encoded audio 1046, encoded video 1048, and haptic feedback data 1050 at the client device. If the data has been encrypted, then the network packets are also decrypted. The encoded audio 1046 and encoded video 1048 are then decoded by the client device, as indicated at reference 1044, to generate client-side raw audio and video data for rendering on a display device 1052. The haptic feedback data 1050 can be processed/communicated to produce a haptic feedback effect at a controller device 1056 or other interface device through which haptic effects can be rendered. One example of a haptic effect is a vibration or rumble of the controller device 1056.

It will be appreciated that a video game is responsive to user inputs, and thus, a similar procedural flow to that described above for transmission and processing of user input, but in the reverse direction from client device to server, can be performed. As shown, a user operating controller device 1056 may generate input data 1058. This input data 1058 is packetized at the client device for transport over the network to the cloud gaming system. The input data packets 1060 are unpacked and reassembled by the cloud gaming server to define input data 1062 on the server-side. The input data 1062 is fed to the gaming system 1018, which processes the input data 1062 to update the game state of the video game.

During transport (ref. 1040) of the audio packets 1034, video packets 1036, and haptic feedback packets 1038, the transmission of data over the network can be monitored to ensure the cloud game stream quality of service. For example, network conditions can be monitored as indicated by reference 1064, including both upstream and downstream network bandwidth, and the game streaming can be adjusted in response to changes in available bandwidth. That is, the encoding and decoding of network packets can be controlled based on present network conditions, as indicated by reference 1066.

Figure 11:
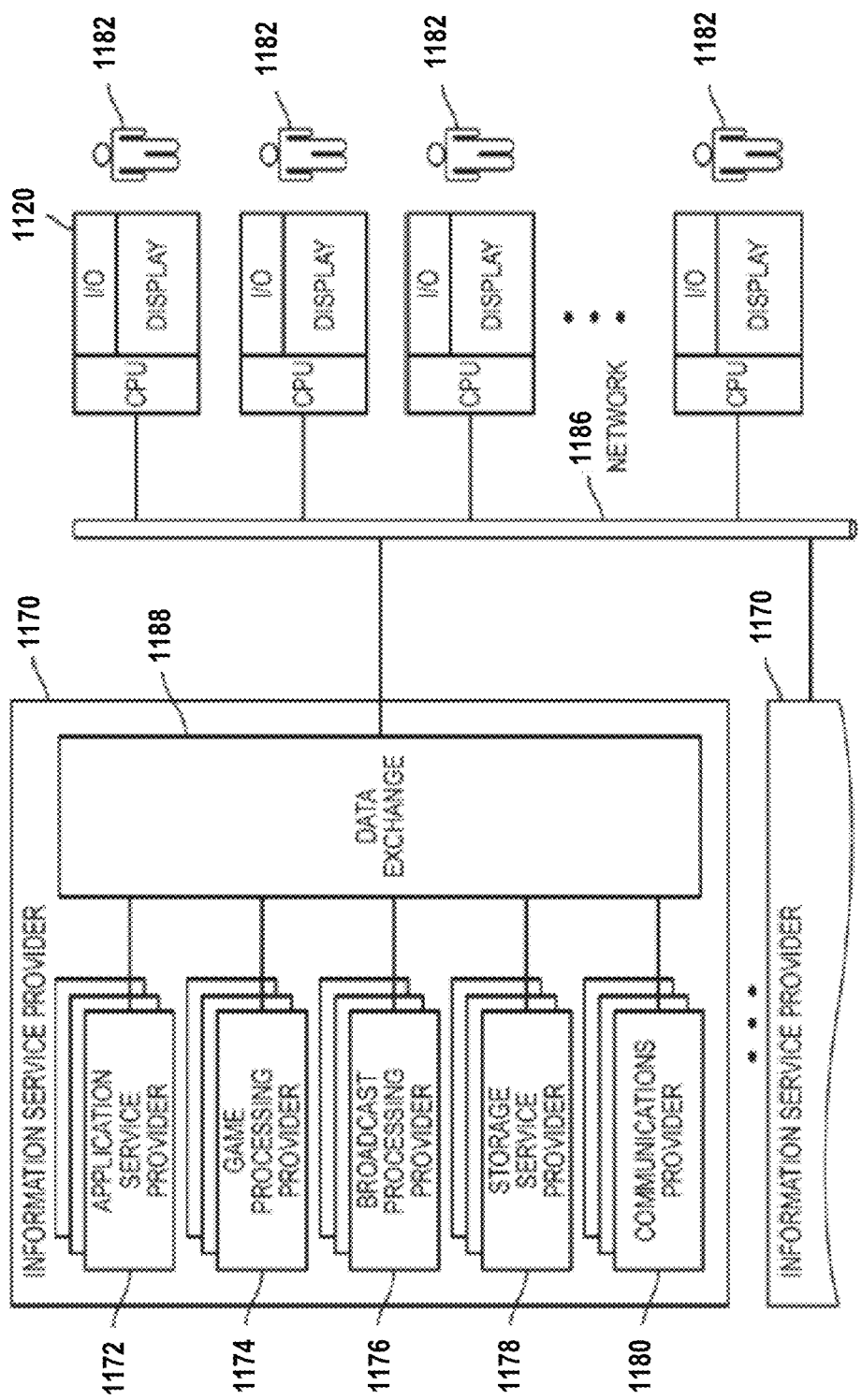
FIG. 11 illustrates an embodiment of an Information Service Provider architecture, in accordance with implementations of the disclosure.

FIG. 11 illustrates an embodiment of an Information Service Provider architecture. Information Service Providers (ISP) 1170 delivers a multitude of information services to users 1182 geographically dispersed and connected via network 1186. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1170 includes Application Service Provider (ASP) 1172, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1170 includes a Game Processing Server (GPS) 1174 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1176 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1178 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1180 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1188 interconnects the several modules inside ISP 1170 and connects these modules to users 1182 via network 1186. Data Exchange 1188 can cover a small area where all the modules of ISP 1170 are in close proximity, or can cover a large geographic area when the different modules are geographically dispersed. For example, Data Exchange 1188 can include a fast Gigabit Ethernet (or faster) within a cabinet of a data center, or an intercontinental virtual area network (VLAN).

Users 1182 access the remote services with client device 1184, which includes at least a CPU, a memory, a display and I/O. The client device can be a PC, a mobile phone, a netbook, tablet, gaming system, a PDA, etc. In one embodiment, ISP 1170 recognizes the type of device used by the client and adjusts the communication method employed. In other cases, client devices use a standard communications method, such as html, to access ISP 1170.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method executed by a processor of a server, comprising:
   monitoring gameplay activity in a plurality of game sessions, wherein the monitoring includes, for each game session, analyzing the gameplay activity in said game session to predict future gameplay activity in said game session;
   identifying one or more characteristics of a plurality of spectators interacting with a virtual character, the interacting with the virtual character enabled by each of the spectators accessing, over a network, a channel on a communication platform separate from the plurality of game sessions, the channel being attributed to the virtual character and the interacting with the virtual character occurring on the communication platform, wherein the virtual character defines a virtual influencer on the communication platform, at least some of the spectators being subscribers of the virtual character on the communication platform; and
   generating a visual recommendation through the channel to the spectators to direct the spectators to spectate a selected game session that is one of the plurality of game sessions, wherein the visual recommendation is visually communicated through the virtual character to each of the spectators via the channel on the communication platform separate from the selected game session, the selected game session is selected based on the predicted future gameplay activity and based on the characteristics of the plurality of spectators.

2. The method of claim 1, wherein the channel is defined by a web site, a social media platform, a game spectating platform, or a video sharing platform.

3. The method of claim 1, wherein the channel is configured to provide access for the spectators to stream video content ascribed to, or attributed as being curated by, the virtual character.

4. The method of claim 1, wherein generating the visual recommendation includes indicating through the channel that the virtual character is spectating the selected game session.

5. The method of claim 1, wherein spectating the selected game session includes streaming video of the selected game session, over the network, to a plurality of client devices associated to the plurality of spectators.

6. The method of claim 1, wherein spectating the selected game includes providing, over the network, voice narration of the selected game that is attributed to the virtual character.

7. The method of claim 1, wherein monitoring the gameplay activity in a given one of the game sessions includes, receiving, over the network, gameplay metadata from the given one of the game sessions.

8. The method of claim 7, wherein the gameplay metadata identifies one or more of a location of a player in a virtual environment, inputs, or gameplay events.

9. The method of claim 1, wherein analyzing the gameplay activity includes applying a machine learning model to the gameplay activity to predict the future gameplay activity.

10. The method of claim 1, wherein identifying the characteristics of the spectators includes determining one or more of preferences of the spectators, locations of the spectators, ages of the spectators, spectating histories of the spectators, gameplay histories of the spectators.

11. A system comprising at least one server having at least one processor configured to perform a method including the following operations:
monitoring gameplay activity in a plurality of game sessions, wherein the monitoring includes, for each game session, analyzing the gameplay activity in said game session to predict future gameplay activity in said game session;
identifying one or more characteristics of a plurality of followers of a virtual character on a social platform separate from the plurality of game sessions, the followers of the virtual character being subscribers to the virtual character on the social platform, wherein the virtual character defines a virtual influencer on the social platform;
providing, over a network, a visual recommendation to the followers of the virtual character to direct the followers to spectate, over the network a selected game session that is one of the plurality of game sessions, wherein the visual recommendation is visually communicated through the virtual character to each of the spectators via the social platform separate from the selected game session, the selected game session being selected based on the predicted future gameplay activity and based on the characteristics of the plurality of spectators.

12. The system of claim 11, wherein being subscribers to the virtual character on the social platform enables receipt by the followers of updates from the virtual character on the social platform.

13. The system of claim 12, wherein receipt of updates from the virtual character includes receipt of a posting attributed to the virtual character that provides access to spectate the selected game session.

14. The system of claim 11, wherein spectating the selected game includes providing, over the network, voice narration of the selected game that is attributed to the virtual character.

15. The system of claim 11, wherein monitoring the gameplay activity in a given one of the game sessions includes, receiving, over the network, gameplay metadata from the given one of the game sessions.

16. The system of claim 15, wherein the gameplay metadata identifies one or more of a location of a player in a virtual environment, inputs, or gameplay events.

17. The system of claim 11, wherein analyzing the gameplay activity includes applying a machine learning model to the gameplay activity to predict the future gameplay activity.

18. The system of claim 11, wherein identifying the characteristics of the followers includes determining one or more of preferences of the followers, locations of the followers, ages of the followers, spectating histories of the followers, gameplay histories of the followers.

* * * * *